(12) United States Patent
Lee et al.

(10) Patent No.: US 12,048,064 B2
(45) Date of Patent: Jul. 23, 2024

(54) METHOD FOR PERFORMING SERVICE PARAMETER PROVISIONING TO UE AND NETWORK IN 5G SYSTEM

(71) Applicant: Samsung Electronics Co., Ltd., Suwon-si (KR)

(72) Inventors: Hoyeon Lee, Suwon-si (KR); Sunghoon Kim, Suwon-si (KR); Jungshin Park, Suwon-si (KR); Jungje Son, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 17/385,725

(22) Filed: Jul. 26, 2021

(65) Prior Publication Data

US 2021/0352465 A1   Nov. 11, 2021

Related U.S. Application Data

(63) Continuation of application No. 16/595,258, filed on Oct. 7, 2019, now Pat. No. 11,115,805.

(30) Foreign Application Priority Data

Oct. 5, 2018  (KR) ........................ 10-2018-0119055

(51) Int. Cl.
| | | |
|---|---|---|
| *H04M 3/00* | (2024.01) | |
| *H04W 4/40* | (2018.01) | |
| *H04W 8/20* | (2009.01) | |

(52) U.S. Cl.
CPC ............. *H04W 8/205* (2013.01); *H04W 4/40* (2018.02)

(58) Field of Classification Search
CPC .......... H04W 8/205; H04W 4/40; H04W 4/50
USPC .................................. 455/419; 370/338
See application file for complete search history.

(56) References Cited

U.S. PATENT DOCUMENTS

| | | |
|---|---|---|
| 2006/0170965 A1 | 8/2006 | Ohara |
| 2010/0310078 A1 | 12/2010 | Kim et al. |
| | (Continued) | |

FOREIGN PATENT DOCUMENTS

| | | |
|---|---|---|
| CN | 107852591 A | 3/2018 |
| EP | 3314978 A1 | 5/2018 |
| | (Continued) | |

OTHER PUBLICATIONS

International Search Report and Written Opinion of the International Searching Authority in connection with International Application No. PCT/KR2019/013140 dated Jan. 30, 2020, 7 pages.

(Continued)

*Primary Examiner* — Marcos Batista

(57) ABSTRACT

A method for providing a vehicle-to-everything (V2X) service in a 5G mobile communication system. In accordance with an aspect of the disclosure, a method performed by a device for performing a network exposure function (NEF) in a communication system, the method comprising: receiving, from a server, a request message including request information related to service-specific information; changing data in a unified data repository (UDR) on the basis of the request message; and performing provisioning of the changed data to a user equipment (UE) via a policy control function (PCF) is provided.

20 Claims, 10 Drawing Sheets

(56) References Cited

U.S. PATENT DOCUMENTS

| | | |
|---|---|---|
| 2016/0381720 A1 | 12/2016 | Baek et al. |
| 2018/0192390 A1 | 7/2018 | Li et al. |
| 2019/0021064 A1 | 1/2019 | Ryu et al. |
| 2019/0053104 A1 | 2/2019 | Qiao et al. |
| 2019/0261260 A1* | 8/2019 | Dao .................. H04W 48/00 |

FOREIGN PATENT DOCUMENTS

| | | |
|---|---|---|
| WO | 2017003161 A1 | 1/2017 |
| WO | 2018/008944 A1 | 1/2018 |

OTHER PUBLICATIONS

Ericsson, "Clarifications on Nudr interactions between PCF and UDR," S2-184570, 3GPP TSG-SA2 Meeting #127, Sanya, China, Apr. 16-20, 2018, 20 pages.

Motorola Mobility et al., "Update to solution 8—Routing media traffic via different 5G network slices," S2-184457 (revision of S2-184124), SA WG2 Temporary Document, SA WG2 Meeting #127, Sanya, China, Apr. 16-20, 2018, 12 pages.

Samsung, "SBI friendly UE policy delivery procedure," S2-187074 revision of S2-186904, 3GPP TSG SA WG2 Meeting #128, Vilnius, Lithuania, Jul. 2-6, 2018, 12 pages.

"3rd Generation Partnership Project; Technical Specification Group Services and System Aspects; Procedures for the 5G System; Stage 2 (Release 15)", 3GPP TS 23.502 V15.3.0 (Sep. 2018), 330 pages.

Samsung et al., "KI#5 & KI#11—solution 24 evaluation and conclusion", SA WG2 Meeting #129bis, Nov. 26-30, 2018, S2-1812225, 7 pages.

Supplementary European Search Report dated Jul. 28, 2021 in connection with European Patent Application No. 19 86 9174, 12 pages.

Office Action dated Oct. 12, 2022 in connection with Indian Patent Application No. 202137013642, 6 pages.

The First Office Action dated Oct. 18, 2023, in connection with Chinese Application No. 201980065512.7, 21 pages.

\* cited by examiner

METHOD FOR PERFORMING SERVICE PARAMETER PROVISIONING TO UE AND NETWORK IN 5G SYSTEM

CROSS-REFERENCE TO RELATED APPLICATION

This application is a continuation of U.S. patent application Ser. No. 16/595,258 filed on Oct. 7, 2019, which is based on and claims priority under 35 U.S.C. 119 to Korean Patent Application No. 10-2018-0119055 filed on Oct. 5, 2018 in the Korean Intellectual Property Office, the disclosures of which are herein incorporated by reference in their entirety.

BACKGROUND

1. Field

The disclosure relates to a method for providing a vehicle-to-everything (V2X) service in a 5G mobile communication system.

2. Description of Related Art

Vehicle-to-everything (V2X) is a general term that refers to all types of communication schemes applicable to road vehicles. With the advancement of wireless communication technology, V2X enables various additional services, in addition to initial safety use cases.

Wireless access in vehicular environments (WAVE) standards based on IEEE 802.11p and IEEE P1609 have been established to provide V2X services. However, WAVE, a type of dedicated short range communication (DSRC) technology, has a limitation on the coverage of messages between vehicles.

To overcome this limitation, the 3GPP is currently in the process of specifying standards for cellular-based V2X technology. LTE-based evolved packet system (EPS) V2X standards have been completed in Release 14/Release 15, and NR-based $5^{th}$ generation system (5GS) V2X standards are under discussion in Release 16.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method for provisioning V2X service-related parameters to a user equipment (UE) in a V2X system.

The technical subjects pursued in the disclosure may not be limited to the above mentioned technical subjects, and other technical subjects which are not mentioned may be clearly understood through the following descriptions by those skilled in the art of the disclosure.

In accordance with an aspect of the disclosure, a method performed by a device for performing a network exposure function (NEF) in a communication system, the method comprising: receiving, from a server, a request message including request information related to service-specific information; changing data in a unified data repository (UDR) on the basis of the request message; and performing provisioning of the changed data to a user equipment (UE) via a policy control function (PCF) is provided.

In accordance with another aspect of the disclosure, a method performed by a device for performing a unified data repository (UDR) function in a communication system, the method comprising: receiving, from a network exposure function (NEF), request information related to service-specific information; changing data on the basis of the request information; and performing provisioning of the changed data to a user equipment (UE) via a policy control function (PCF) is provided.

In accordance with another aspect of the disclosure, a method performed by a device for performing a policy control function (PCF) in a communication system, the method comprising: transmitting, to a unified data repository (UDR), a first message for a notification subscription corresponding to changing of data in the UDR; receiving, from the UDR, a second message corresponding to the changing of the data in the UDR, in response to the first message; and performing provisioning of information included in the second message to a user equipment (UE) via an access and mobility management function (AMF) is provided.

According to the disclosure, there is an advantage in that a vehicle UE can use a vehicular communication service provided in a V2X system. Here, the vehicle UE may be a built-in device of a vehicle or a terminal attached to a vehicle, such as a smartphone or a black box.

A UE according to an embodiment can be connected to a 5GS so as to use a 5GS V2X service through an LTE or NR radio technology, and a V2X service provider can perform V2X service parameter provisioning to the UE.

Effects obtainable from the disclosure may not be limited to the above mentioned effects, and other effects which are not mentioned may be clearly understood through the following descriptions by those skilled in the art of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms as described below are those defined in consideration of the functions in the disclosure, and thus the meanings thereof may be different according to users, intentions of operators, or customs. Therefore, the definitions of the terms should be made on the basis of the contents throughout the specification.

As used herein, terms for identifying access nodes, terms referring to network entities, terms referring to messages, terms referring to interfaces between network entities, terms referring to various identification information, and the like are illustratively provided for the convenience of description. Therefore, the disclosure is not limited by the terminology provided below, and other terms indicating subjects having equivalent technical meanings may be used.

In describing the disclosure below, terms and names defined in the standards for 5G systems will be used for the convenience of description. However, the disclosure is not limited by those terms and names, and may also be similarly applied to systems according to other standards.

In the following detailed description of embodiments, the disclosure is directed to the communication standards defined by 3GPP, but the subject matter of the disclosure can be applied to any other communication system having the similar technical background through slight modifications and changes, which may be made according to determinations of those skilled in the art, without departing from the scope of the disclosure.

In the following detailed description of embodiments, the disclosure is directed to a vehicular communication service, but the subject matter of the disclosure can be applied to any other service provided in a 5G network through slight modifications and changes, which may be made according to determinations of those skilled in the art, without departing from the scope of the disclosure.

Figure 1:
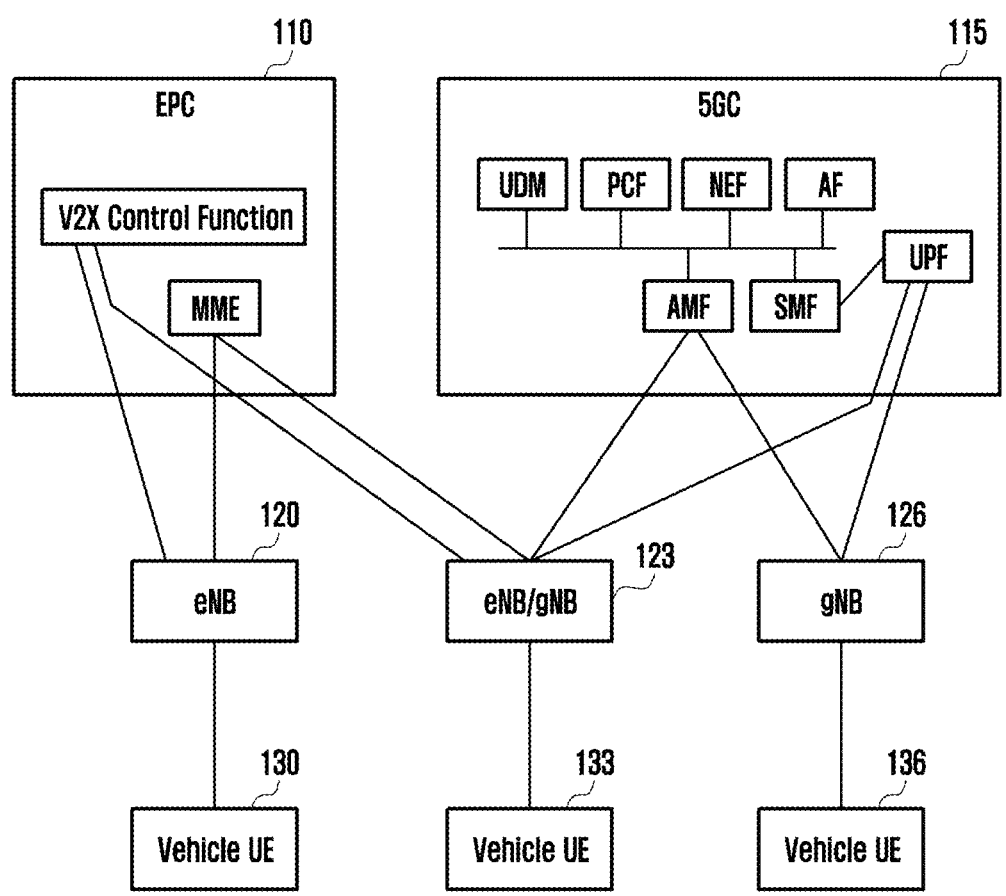
FIG. 1 illustrates a configuration view of an example of a V2X system architecture and connections between network entities and vehicle UEs according to an embodiment.

FIG. 1 illustrates a configuration view of an example of a V2X system architecture and connections between network entities and vehicle UEs according to an embodiment. An evolved packet system (EPS)-based V2X system may include an evolved packet core (EPC) core network 110 and long term evolution (LTE) base stations 120, 123. A $5^{th}$ generation system (5GS)-based V2X system may include a $5^{th}$ generation core (5GC) core network 115 and new radio (NR) base stations 123, 126. In the following description, the terms "base station" and "radio access network (RAN)" may be used interchangeably. Further, the terms "LTE base station", "4G base station", and "eNB" may be used interchangeably. Further, the terms "NR base station", "5G base station", and "gNB" may be used interchangeably. Further, the terms "application server (AS)" and "application function (AF)" may be used interchangeably.

The base station 123 connected concurrently to the EPC core network 110 and the 5GC core network 115 can provide both the LTE base station function and the NR base station function. The base station 123 may be referred to as "5G base station" or "gNB". The EPS V2X function in the disclosure means a function of allowing a UE to access an EPS, which is the 4G core network, so as to use a V2X service. Since a 4G UE uses LTE as the wireless access technology, it can be said that a UE supporting the EPS V2X function accesses an EPS and uses the LTE V2X function. LTE V2X means a V2X technology which is provided as a device-to-device communication technology in LTE, and may be referred to as "LTE PC5". The 5GS V2X function in the disclosure means a function of allowing a UE to access an 5GS, which is the 5G core network, so as to use a V2X service. Since a 5G UE can use LTE (or LTE advanced) and new radio (NR) as the wireless access technology, it can be said that a UE supporting the 5GS V2X function accesses a 5GS and uses the LTE V2X and NR V2X functions. NR V2X means a V2X technology which is provided as a device-to-device communication technology in NR, and may be referred to as "NR PC5 interface".

A vehicle UE according to an embodiment may provide the EPS V2X function, the 5GS V2X function, or both the EPS V2X function and the 5GS V2X function. The vehicle UE providing the EPS V2X function can provide an LTE-based direct communication interface (e.g., LTE PC5 interface, D2D interface, or the like). Further, the vehicle UE providing the EPS V2X function can access an EPS core so as to be provided with a V2X service from a V2X application server (AS) through the EPS core. The vehicle UE providing the 5GS V2X function can provide an 5G-based direct communication interface (e.g., NR PC5 interface, D2D interface, or the like). Further, the vehicle UE providing the 5GS V2X function can access a 5GS core so as to be provided with a V2X service from a V2X AS through the 5GS core.

Referring to FIG. 1, a vehicle UE 130 having the EPS V2X function may be connected to the EPC core network 110 via the LTE base station 120 by using the EPS V2X function. Alternatively, a vehicle UE 136 having the 5GS V2X function may be connected to the 5GC core network 115 via the NR base station 126 by using the 5GS V2X function. Alternatively, a vehicle UE 133 having the EPS V2X function and the 5GS V2X function may be connected to the EPC core network 110 via the LTE base station 123 by using the EPS V2X function. Alternatively, the vehicle UE 133 having the EPS V2X function and the 5GS V2X function may be connected to the 5GC core network 115 via the NR base station 123 by using the 5GS V2X function.

Referring to FIG. 1, the 5GC core network 115 may include network entities. The network entities may include AMF, SMF, UPF, UDM, PCF, NEF, AF, and the like defined by 3GPP.

A 5G network system according to an embodiment can provide various services on the 5G network. That is, service providers (SPs) for services can provide the services through the 5G network.

In order to provide the services through the 5G network system, the service providers may have to provision service-related pre-configuration information to UEs. To this end, the 5G system may provide a method by which the service providers can perform service-related pre-configuration information provisioning to UEs.

An example of a UE provisioning service provided in the 5G system is shown in Table 1 below.

TABLE 1

| Service Name | Service Operations | Operation Semantics | Example Consumer(s) |
| --- | --- | --- | --- |
| Nnef_UEProvisioning | Create | Request/Response | AF |
| | Update | Request/Response | AF |
| | Delete | Request/Response | AF |

Referring to Table 1 showing examples of NF services provided by the NEF, the 5G system may allow a service provider to transmit configuration information to a UE. The service provider may be represented by "application server (AS)" or "application function (AF)".

Figure 2:
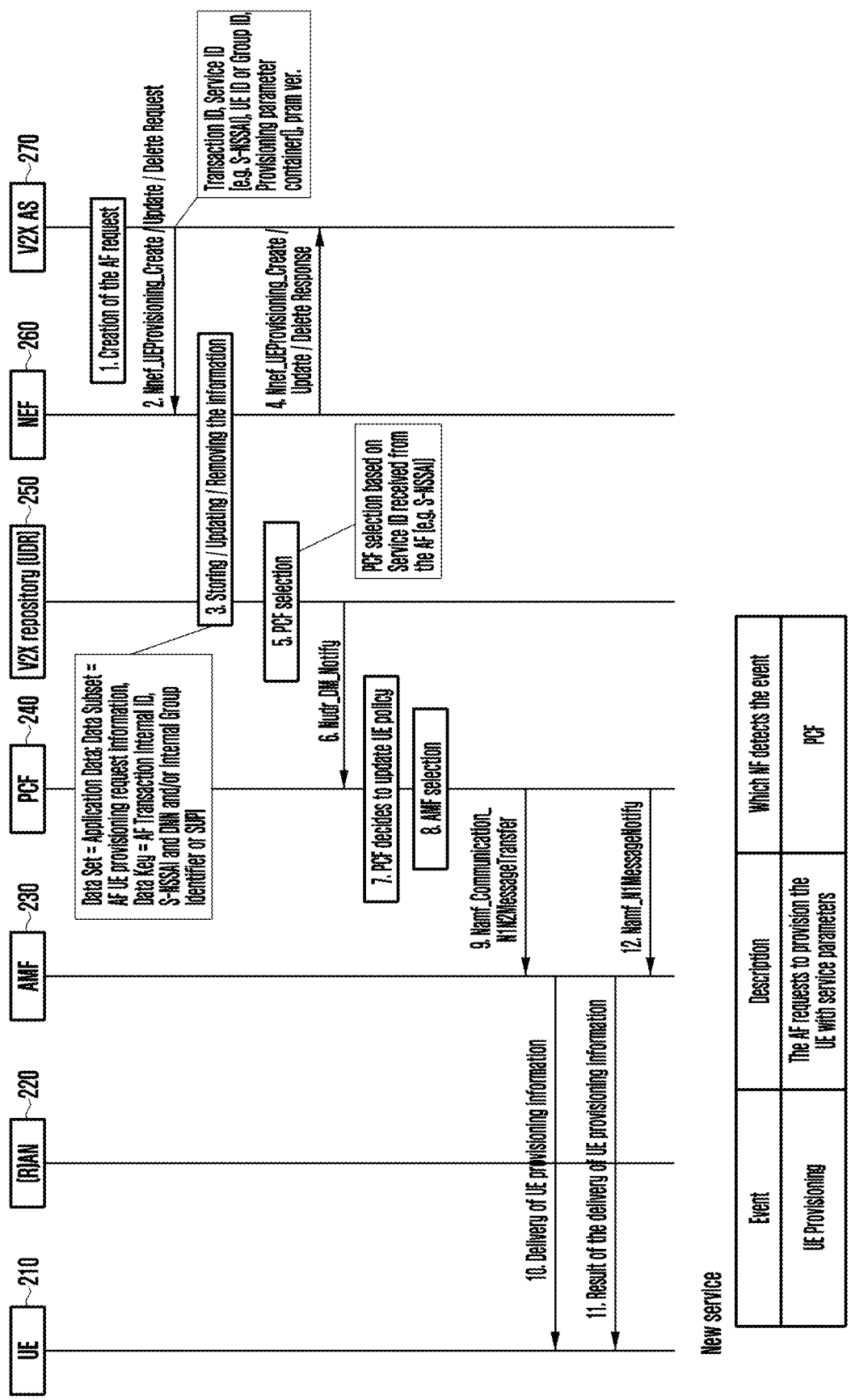
FIG. 2 illustrates a UE provisioning procedure according to an embodiment.

A V2X AS according to an embodiment may deliver V2X service-related service parameter configuration information to a UE by using the Nnef_UEProvisioning service according to a procedure illustrated in FIG. 2. In the detailed description of embodiments, the service name of a service for provisioning service-related pre-configuration information to a UE by the 5G system is referred to as "Nnef_UEProvisioning", but this is merely an example, and the service may be referred to as any other service name such as Nnef_ServiceProvisioning or Nnef_ServiceParameterProvisioning.

The Nnef_UEProvisioning service in Table 1 may provide services as shown in Table 2 below.

TABLE 2

Service description: This service provides:
Request authorization of NF Service Consumer requests.
Request parameter mapping from NF Service
Consumer requests to 5GC parameters and vice versa
as described in clause 6.X.1.2.
NF Service Consumer request routing (forwarding)
to actual NF Service
Producer to deliver provisioning information to the UE.

The "Create" operation of the Nnef_UEProvisioning service may require input and output values as shown in Table 3 below.

TABLE 3

Inputs (required): AF Transaction Id, Service Id, UE Id, Provisioning information.
The AF Transaction Id refers to the request.
The Service Id refers to V2X service. The Service Id is used to find the actual NF Service Producer.
UE Id refers to an individual UE or a group of UEs that the Provisioning information shall be delivered to.
Provisioning information includes V2X service parameters that the V2X AS wants to provision with the UE
Inputs (optional): None.
Outputs (required): Operation execution result indication.
Outputs (optional): None.

The provisioning information in Table 3 may include values given in Tables 7, 8, 9, and 10.

The "Update" operation of the Nnef_UEProvisioning service may require input and output values as shown in Table 4.

TABLE 4

Service operation name: Nnef_UEProvisioning_Update
Description: Authorize the request and forward the request to update UE provisioning.
Inputs (required): AF Transaction Id.
The AF Transaction Id identifies the NF Service Consumer request to be updated.
Inputs (optional): Same optional information as in Nnef_UEProvisioning_Create Input.
Outputs (required): Operation execution result indication.
Outputs (optional): None The "Delete" operation of the Nnef_UEProvisioning service may require input and output values as shown in Table 5.

TABLE 5

Service operation name: Nnef_UEProvisioning_Delete
Description: Authorize the request and forward the request to delete(s) request for UEprovisioning.
Inputs (required): AF Transaction Id.
The AF Transaction Id identifies the NF Service Consumer request for UE provisioning to be deleted.

TABLE 5-continued

Inputs (optional): None.
Outputs (required): Operation execution result indication.
Outputs (optional): None.

FIG. 2 illustrates a UE provisioning procedure according to an embodiment.

Referring to FIG. 2, the V2X AS 270 according to an embodiment may generate a UE provisioning request message for service parameter provisioning to a UE which has subscribed to a V2X service (step 1). An example of the UE provisioning request message generated by the V2X AS is shown in Table 6 below.

TABLE 6

| Information Name | Applicable for PCF or NEF (NOTE 1) | Applicable for NEF only | Category |
|---|---|---|---|
| Service Description | Defines the target service, represented by the combination of DNN and optionally S-NSSAI, and application identifier. | The target service can be represented by AF-Service-Identifier, instead of combination of DNN and optionally S-NSSAI. | Mandatory |
| Target UE Identifier(s) | Indicates the UE(s) that the request is targeting, i.e. an individual UE or a group of UE represented by Internal Group Identifier. | GPSI (Generic Public Subscription Identifier) can be applied to identify the individual UE, or External Group Identifier can be applied to identify a group of UEs. | Mandatory |
| AF transaction identifier | The AF transaction identifier refers to the AF request. | N/A | Mandatory |
| Service parameters | Provisioning policy/parameters for the service. | N/A | Mandatory |
| PII (Provisioning Information Identifier) | The service parameters is identified by the PII | N/A | Mandatory |

NOTE 1:
The information is stored in the UDR by the NEF and notified to the PCF by the UDR.

The UE provisioning request message may include "Service Description" which indicates the service provided by the V2X AS 270. The V2X AS according to an embodiment provides a vehicular communication service (V2X), and thus the "Service Description" may be represented by a value indicating V2X (e.g., AF-Service-Identifier indicating V2X, S-NSSAI indicating V2X, or the like).

The UE provisioning request message may include "Target UE Identifier(s)" which indicates the UE that is the target for delivery of service parameters provided by the V2X AS 270. The V2X AS according to an embodiment may include a GPSI or External Group Identifier as the "Target UE identifier". The GPSI may indicate one UE. The External Group Identifier may indicate a group of one or more UEs.

The UE provisioning request message may include "AF transaction identifier" for identifying the UE provisioning request message generated by the V2X AS.

The UE provisioning request message may include configuration information (corresponding to "Service parameters" in Table 6) which is necessary for the UE 210 to use the V2X service provided by the V2X AS 270. Further, the UE provisioning request message may include the version information (corresponding to "PII (Provisioning Information identifier)" in Table 6) of the "Service parameters".

The V2X service configuration information (corresponding to the "Service parameters" in Table 6) may include V2X service-related configuration information for a vehicle UE having the 5GS V2X function. Further, the V2X service configuration information (corresponding to the "Service parameters" in Table 6) may include V2X service-related configuration information for a vehicle UE having the EPS V2X function.

For PC5 communication (device-to-device communication) of a vehicle UE having the 5GS V2X function, the V2X service-related configuration information for a vehicle UE having the 5GS V2X function may include information as shown in Table 7 below.

TABLE 7

When the UE is in coverage:
When the UE is "served by NR":
PLMN(s) in which the UE is authorized to perform eV2X communications over PC5 reference point;
RAT(s) over which the UE is authorized to perform eV2X communications over PC5 reference point in the above PLMN.
When the UE is "served by E-UTRA connected to 5GC":
PLMN(s) in which the UE is authorized to perform eV2X communications over PC5 reference point;
RAT(s) over which the UE is authorized to perform eV2X communications over PC5 reference point in the above PLMN.
When the UE is out of coverage:
Indicates whether the UE is authorized to perform eV2X communications over PC5 reference point Further, for Uu communication (communication through a network) of a vehicle UE having the 5GS V2X function, the V2X service-related configuration information for a vehicle UE having the 5GS V2X function may include information as shown in Table 8 below.

TABLE 8

1) PLMNs in which the UE is authorized to use MBMS based V2X communication.
Corresponding V2X USD(s) for receiving MBMS based V2X traffic in the PLMN. The V2X USD(s) may be obtained through the V2 reference point from the V2X Application Server.
NOTE: The V2 reference point procedure is not specified in this Release.
2) V2X Application Server address information.
List of FQDNs or IP addresses of the V2X Application Servers, associated with served geographical area information and list of PLMNs that the configuration applies to.
3) V2X Application Server discovery using MBMS.
List of PLMNs and corresponding V2X Server USDs for receiving V2X Application Server information via MBMS.
4) Mapping of the V2X services, e.g. PSID or ITS-AIDs of the V2X application to:
V2X Application Server address (consisting of IP address/FQDN and UDP port) for unicast;
V2X USD for MBMS For PC5 communication (device-to-device communication) of a vehicle UE having the EPS V2X function, the V2X service-related configuration information for a vehicle UE having the EPS V2X function may include information as shown in Table 9 below.

TABLE 9

1) Authorization policy:
When the UE is "served by E-UTRAN":
PLMNs in which the UE is authorized to perform V2X communications over PC5 reference point.
When the UE is "not served by E-UTRAN":
Indicates whether the UE is authorized to perform V2X communications over PC5 reference point when "not served by E-UTRAN".

TABLE 9-continued

2) Radio parameters for when the UE is "not served by E-UTRAN":
Includes the radio parameters with Geographical Area(s)
and an indication of whether they are "operator managed"
or "non-operator managed. These radio
parameters (e.g. frequency bands) are defined in TS 36.331 [9]. The
UE uses the radio parameters to perform V2X communications over
PC5 reference point when "not served by E-UTRAN" only if the
UE can reliably locate itself in the corresponding Geographical
Area. Otherwise, the UE is not authorized to transmit.
NOTE 1: Whether a frequency band is
"operator managed" or "non-operator managed" in a given
Geographical Area is defined by local regulations.
3) Policy/parameters:
The mapping of Destination Layer-2 ID(s) and the V2X services, e.g.
PSID or ITS-AIDs of the V2X application.
NOTE 2: PLMN operators coordinate to make sure Destination
Layer-2 ID(s) for different V2X services are configured
in a consistent manner.
NOTE 3: To pre-configure a UE with the provisioning
parameters, at least the "not served by E-UTRAN" parameters
of 1) and 2), and the parameters of 3) need to be included.
The mapping of ProSe Per-Packet Priority
and packet delay budget for V2X
communication (autonomous resources selection mode).
The list of V2X services, e.g. PSID or ITS-AIDs of the V2X
applications, with Geographical Area(s) that require privacy support.
The mapping of service types (e.g. PSID or ITS-AIDs) to
V2X frequencies (see TS 36.300 [10] for further information)
with Geographical Area(s).

Further, for Uu communication (communication through a network) of a vehicle UE having the EPS V2X function, the V2X service-related configuration information for a vehicle UE having the EPS V2X function may include information as shown in Table 10 below.

TABLE 10

1) PLMNs in which the UE is authorized to use MBMS
based V2X communication.
Corresponding V2X USD(s) for receiving MBMS based V2X traffic in the
PLMN. The V2X USD(s) may be obtained through the V2 reference point
from the V2X Application Server.
NOTE: The V2 reference point procedure is not specified in this Release.
2) V2X Application Server address information.
List of FQDNs or IP addresses of the V2X Application Servers, associated
with served geographical area information and list of PLMNs that the
configuration applies to.
3) V2X Application Server discovery using MBMS.
List of PLMNs and corresponding V2X Server USDs for receiving V2X
Application Server information via MBMS.
4) Mapping of the V2X services, e.g. PSID or ITS-AIDs
of the V2X application to:
V2X Application Server address (consisting of IP address/FQDN and UDP
port) for unicast;
V2X USD for MBMS After having generated the UE provisioning request message in step 1, the V2X AS 270 according to an embodiment may transmit the request message to the NEF 260 by using the Nnef_UEProvisioning service (step 2).

When the V2X AS initially generates UE provisioning information for a new vehicle, the message in step 2 may be a "Nnef_UEProvisioning_Create" message. Alternatively, when the V2X AS updates previously generated UE provisioning information, the message in step 2 may be a "Nnef_UEProvisioning_Update" message.

The UE provisioning request message may include the "Transaction ID" identifying the AF request made by V2X AS, the service ID (e.g., network slice ID (e.g., S-NSSAI, etc.) defined for a V2X service) of the service provided by the V2X AS, the UE ID, the group ID of the group to which the UE belongs, and the like as described in Table 6.

Further, the request message may include the V2X service configuration information as described in Tables 7, 8, 9, and 10.

On receiving the UE provisioning request message in step 2, the NEF 260 may store the request message, received from the V2X AS 270, in the UDR 250 when the request message in step 2 is a "Nnef_UEProvisioning_Create" or "Nnef_UEProvisioning_Update" message (step 3). An example of the information which the NEF 260 stores in the UDR 250 is shown in Table 11 below.

TABLE 11

Data Set = Application Data;
Data Subset = AF UE provisioning information with PII,
Data Key = AF Transaction Internal ID, S-NSSAI and DNN
and/or Internal Group Identifier or SUPI After having received the UE provisioning request message in step 2, the NEF 260 may delete information, the "Data Key" of which matches the "AF Transaction Id" included in the request message, from the information stored in the UDR 250 when the request message in step 2 is a "Nnef_UEProvisioning_Delete".

After having stored the V2X AS request message in the UDR 250 in step 3, the NEF 260 may transmit, to the V2XAS 270, a UE provisioning response message which notifies the V2X AS 270 that the UE provisioning request message has been processed (step 4).

After having stored the V2X request information in step 3, the UDR 250 may check the service ID (Service Description) included in the V2X AS request information to determine that the request message is a V2X service provisioning request for a V2X service, and may select the PCF responsible for management of V2X service policy information (step 5). The service ID, the UE ID, etc. may be considered in the PCF selection.

The UDR 250 may transmit a "Nudr_DM_Notify" message to the PCF selected in step 5 (step 6). The "Nudr_DM_Notify" message may include the UE ID (e.g., SUPI) and the like.

On receiving the "Nudr_DM_Notify" message in step 6, the PCF 240 may check the message to determine whether UE provisioning is needed (step 7). When the UE provisioning is needed, the PCF 240 may select the serving AMF to which the UE indicated by the UE ID in the message is currently connected (step 8). A specific method for selecting the AMF may follow the procedure illustrated in FIG. 3 or FIG. 4.

The PCF 240 may transmit a "Namf_Communication_N1N2Message Transfer" message to the AMF selected in step 8 (step 9). The "Namf_Communication_N1N2Message Transfer" message may include the V2X service configuration information generated by the V2X AS in step 1 and transmitted to the NEF 260 in step 2.

On receiving the "Namf_Communication_N1N2Message Transfer" message, the AMF 230 may transmit the corresponding message to the UE 210 (step 10).

On receiving the UE provisioning information message in step 10, the UE 210 may store therein the V2X service configuration information included in the message, and may use the corresponding configuration information for the V2X service.

If the provisioning information is not successfully transmitted to the UE due to the unreachability of the UE in step 10, the AMF 230 may notify the PCF 240 that the UE policy container delivery is unsuccessful. On receiving the message indicating that the UE provisioning information delivery is unsuccessful, the PCF 240 may subscribe to a UE reachability event according to the procedure illustrated in FIG. 6 (step 1 to step 4 of FIG. 6). As illustrated in FIG. 7, if the UE becomes reachable (step 1c of FIG. 7), the AMF 230, 730 may notify the PCF 240, 750 that the UE becomes reachable (step 2b of FIG. 7). On receiving the message in step 2b of FIG. 7 from the AMF 230, 730, the PCF 240, 750 may reattempt to deliver the UE provisioning information by transmitting the message in step 9 of FIG. 2 to the AMF 230, 730 (step 9 to step 12 of FIG. 2).

Further, when desiring to delete previously generated UE provisioning information, the V2X AS 270 according to an embodiment may transmit a "Nnef_UEProvisioning_Delete" message as the message in step 2 of FIG. 2. On receiving the "Nnef_UEProvisioning_Delete" message, the NEF 260 may delete the existing stored UE provisioning information in step 3.

Figure 3:
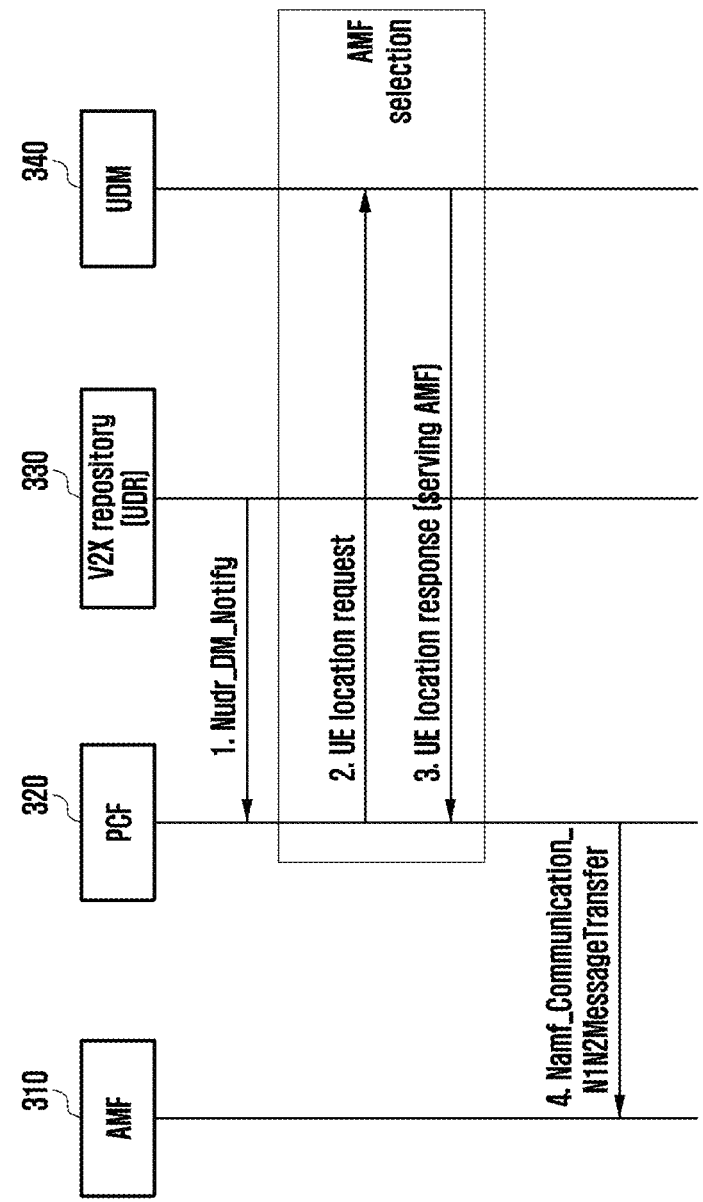
FIG. 3 illustrates an AMF selection procedure according to an embodiment.

FIG. 3 illustrates an AMF selection procedure according to an embodiment.

Step 1 of FIG. 3 may correspond to step 6 of FIG. 2. On receiving the "Nudr_DM_Notify" message from the UDR 330 in step 1 of FIG. 3, the PCF 320 may transmit a UE location information request message to the UDM 340 in order to discover the serving AMF of the UE (step 2). The UE location information request message may include the UE ID (e.g., SUPI or the like). Further, the UE location information request message may include the NF type to be discovered by the PCF 320. According to an embodiment, the NF type may be AMF.

On receiving the UE location information request message, the UDM 340 may discover serving AMF information of the UE corresponding to the UE ID included in the request message. The UDM 340 may transmit a UE location information response message back to the PCF 320 in response to the UE location information request message received in step 2 (step 3). The UE location information response message may include the serving AMF information of the UE.

On receiving the UE location information response message, the PCF 320 may transmit a "Namf_Communication_N1N2MessageTransfer" message to the serving AMF included in the response message (step 4). Step 4 of FIG. 3 may correspond to step 9 of FIG. 2.

Figure 4:
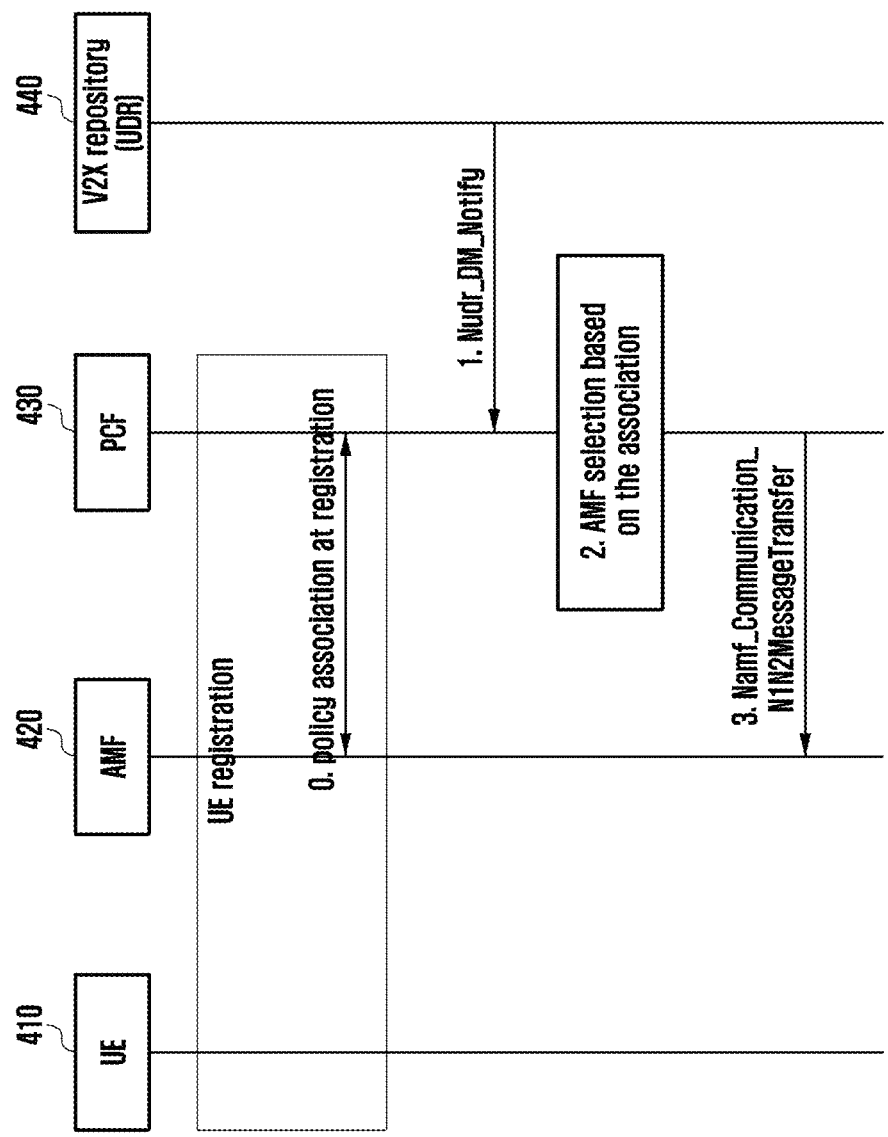
FIG. 4 illustrates an AMF selection procedure according to an embodiment.

FIG. 4 illustrates an AMF selection procedure according to an embodiment.

Figure 8:
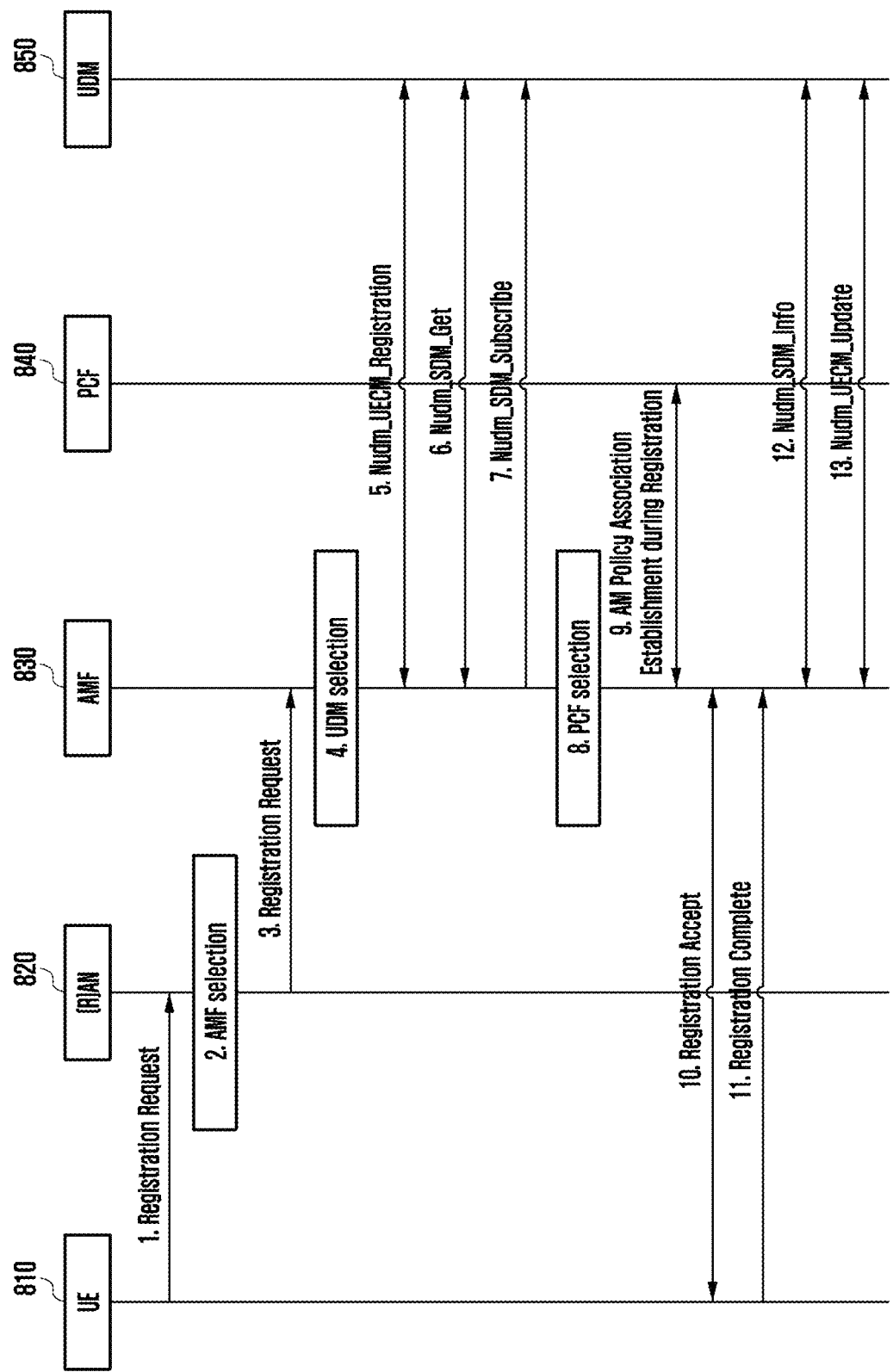
FIG. 8 illustrates a procedure of registering a vehicle UE with a 5G network according to an embodiment.

In order to access a 5G network and use a V2X service, a vehicle UE according to an embodiment may perform a UE registration procedure as shown in FIG. 8. The serving AMF of the UE may be determined in the process of performing the UE registration procedure, and the serving AMF 420 may perform policy association establishment with the PCF 430 (step 0 of FIG. 4 or step 9 of FIG. 8).

Step 1 of FIG. 4 may correspond to step 6 of FIG. 2. On receiving a "Nudr_DM_Notify" message from the UDR 440 in step 1 of FIG. 4, the PCF 430 may transmit a "Namf_Communication_N1N2MessageTransfer" message to the AMF 420 with which policy association establishment has been completed in the previous UE registration procedure (step 3). Step 3 of FIG. 4 may correspond to step 9 of FIG. 2.

A 5G system according to an embodiment may provide a UE reachability event. An example of the UE reachability event provided by the 5G system according to an embodiment is shown in Table 12 below.

TABLE 12

| Event | Description | Which NF detects the event |
|---|---|---|
| UE Reachability | It indicates when the UE becomes reachable for sending either SMS or downlink data to the UE, which is detected when the UE transitions to CM-CONNECTED state or when the UE will become reachable for paging, e.g., Periodic Registration Update timer. | AMF |

Referring to Table 12 showing an example of the event, when the UE transitions to a "CM-CONNECTED" state, the 5G system may notify a network entity (e.g., PCF, AF, or the like) having subscribed to the UE reachability event that the UE becomes reachable for data transmission.

Figure 5:
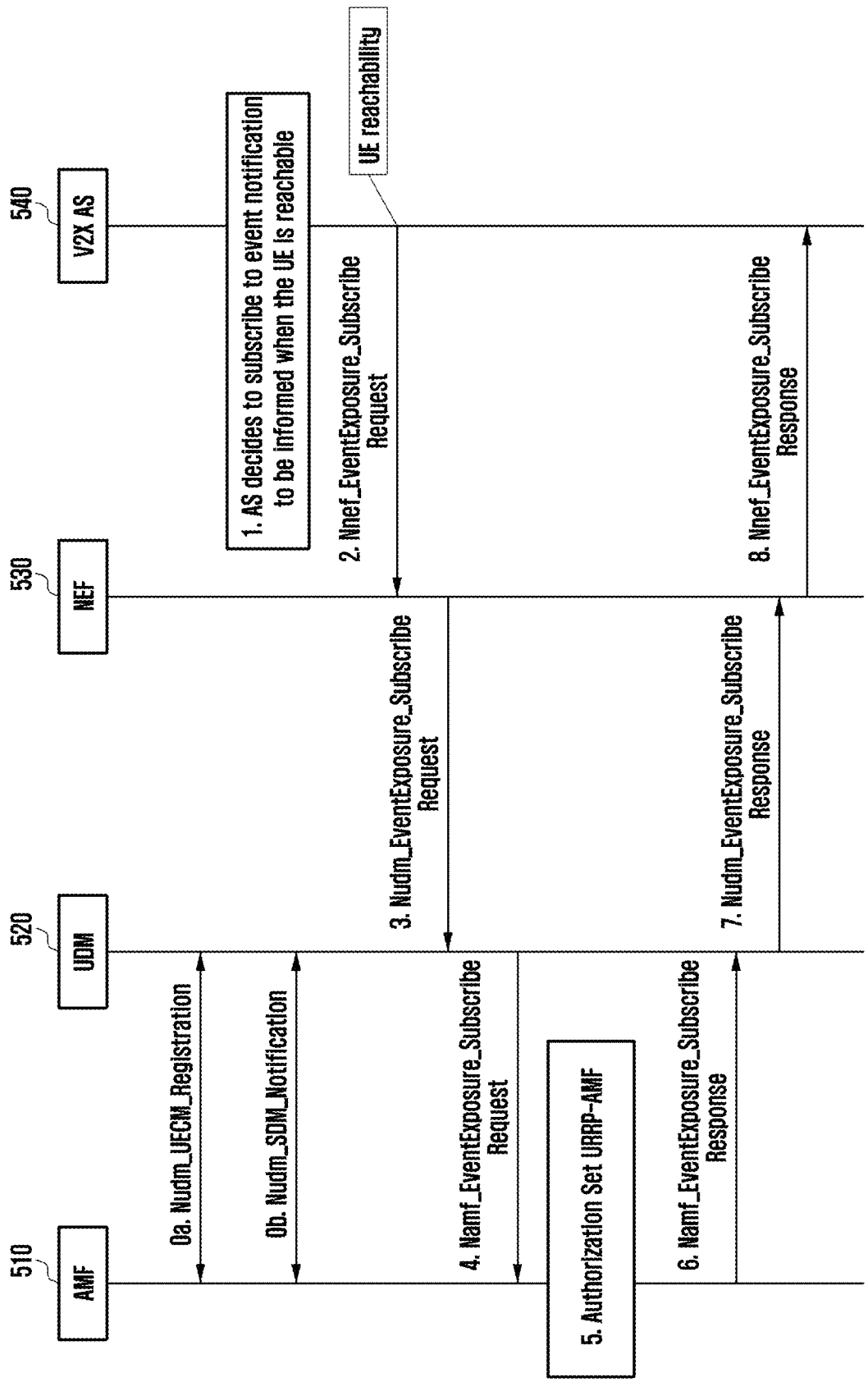
FIG. 5 illustrates a procedure in which an application server (V2X AS) subscribes to a UE reachability event of a UE according to an embodiment.

FIG. 5 illustrates a procedure in which an application server (V2X AS) subscribes to a UE reachability event of a UE according to an embodiment.

The V2X AS 540 according to an embodiment may determine whether to subscribe to a UE reachability event of a UE in order to determine when to transmit data to the UE (step 1).

The V2X AS 540 may transmit a "Nnef_EventExposure_Subscribe" request message to the NEF 530 (step 2). In order to indicate that the V2X AS 540 desires to subscribe to a UE reachability event of a specific UE, the "Nnef_EventExposure_Subscribe" request message may include the event ID indicating the UE reachability and the UE ID of the corresponding UE.

On receiving the "Nnef_EventExposure_Subscribe" request message, the NEF 530 may verify whether the V2X AS 540 is eligible to subscribe to the UE reachability event. Further, in order to process the event subscription request according to the corresponding message, the NEF 530 may transmit a "Nudm_EventExposure_Subscribe" request message to the UDM 520 (step 3).

On receiving the "Nudm_EventExposure_Subscribe" request message, the UDM 520 may verify whether the V2X AS 540 or the NEF 530 is eligible to subscribe to the UE reachability event. If it is determined that the V2X AS 540 or the NEF 530 is eligible to subscribe to the UE reachability event, the UDM 520 may set the URRP-AMF parameter to "set", and may transmit a "Namf_EventExposure_Subscribe" request message to the AMF 510 in order to process the event subscription request according to the corresponding message (step 4).

On receiving the "Namf_EventExposure_Subscribe" request message, the AMF 510 may determine whether the network entity requesting the event is eligible to subscribe to the UE reachability event. If it is determined that the network entity is eligible to subscribe to the UE reachability event, the AMF 540 may set the URRP-AMF parameter to "set" (step 5).

In order to notify the V2X AS 540 that the event subscription request message transmitted by the V2X AS 540 in step 2 has been successfully processed, the AMF 510, the UDM 520, and the NEF 530 may transmit response messages back to the UDM 520, the NEF 530, and the V2X AS 540, respectively (step 6, step 7, and step 8).

The V2X AS according to an embodiment may simultaneously perform the UE provisioning procedure illustrated in FIG. 2 and the UE reachability event subscription event illustrated in FIG. 5. For example, the V2X AS 270, 540 may generate V2X service configuration information for a new vehicle UE 210 (step 1 of FIG. 2), and may transmit a "Nnef_UEProvisioning" request message to the NEF 260 in order to provision the V2X service configuration information to the UE (step 2 of FIG. 2), as illustrated in FIG. 2. At the same time, the V2X AS 270, 540 may determine to subscribe to a UE reachability event of the new vehicle UE (step 1 of FIG. 5), and may transmit a "Nnef_EventExposure_Subscribe" request message to the NEF 530 (step 2 of FIG. 5).

Figure 6:
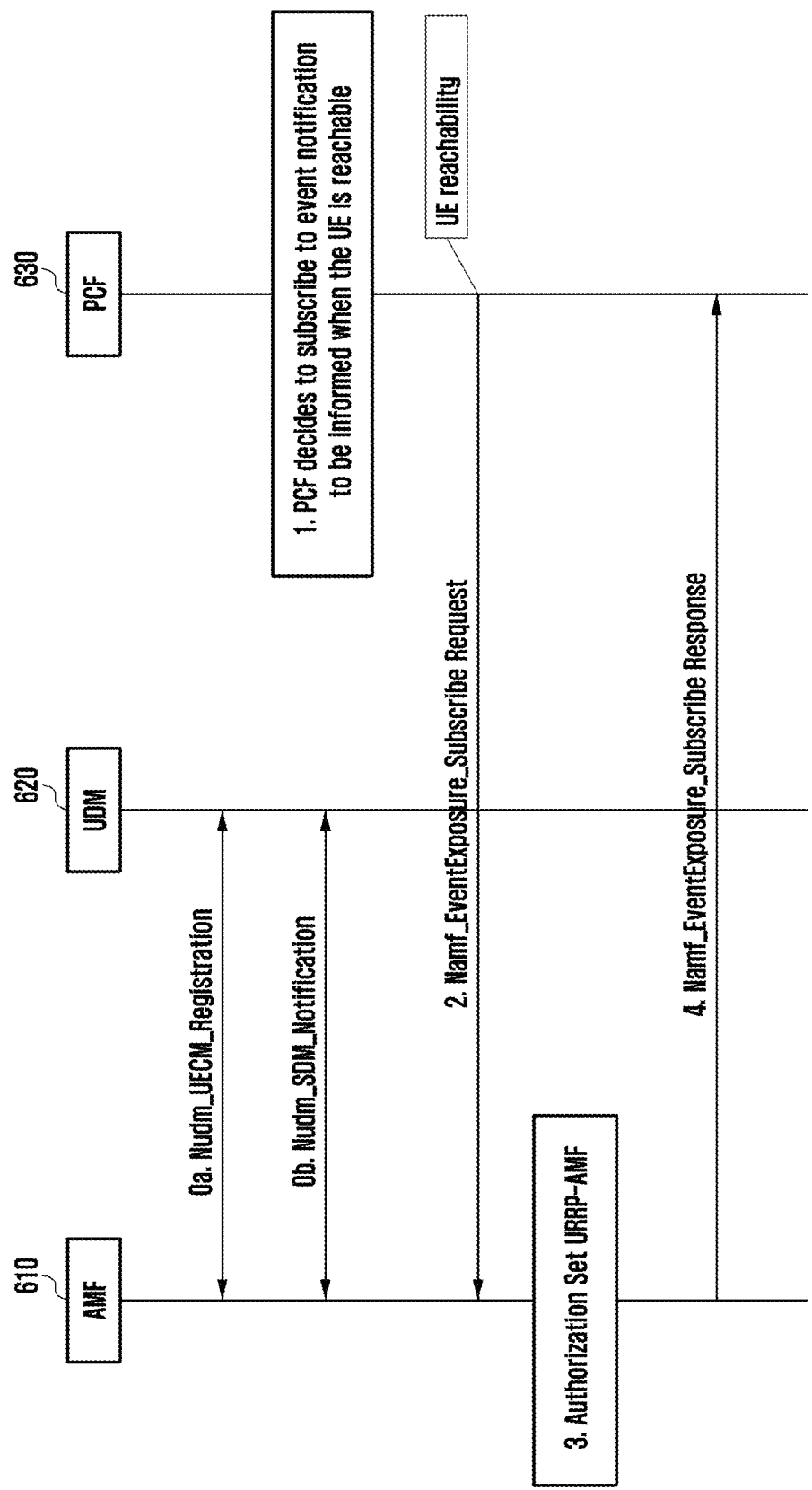
FIG. 6 illustrates a procedure in which a PCF subscribes to a UE reachability event of a UE according to an embodiment.
Figure 7:
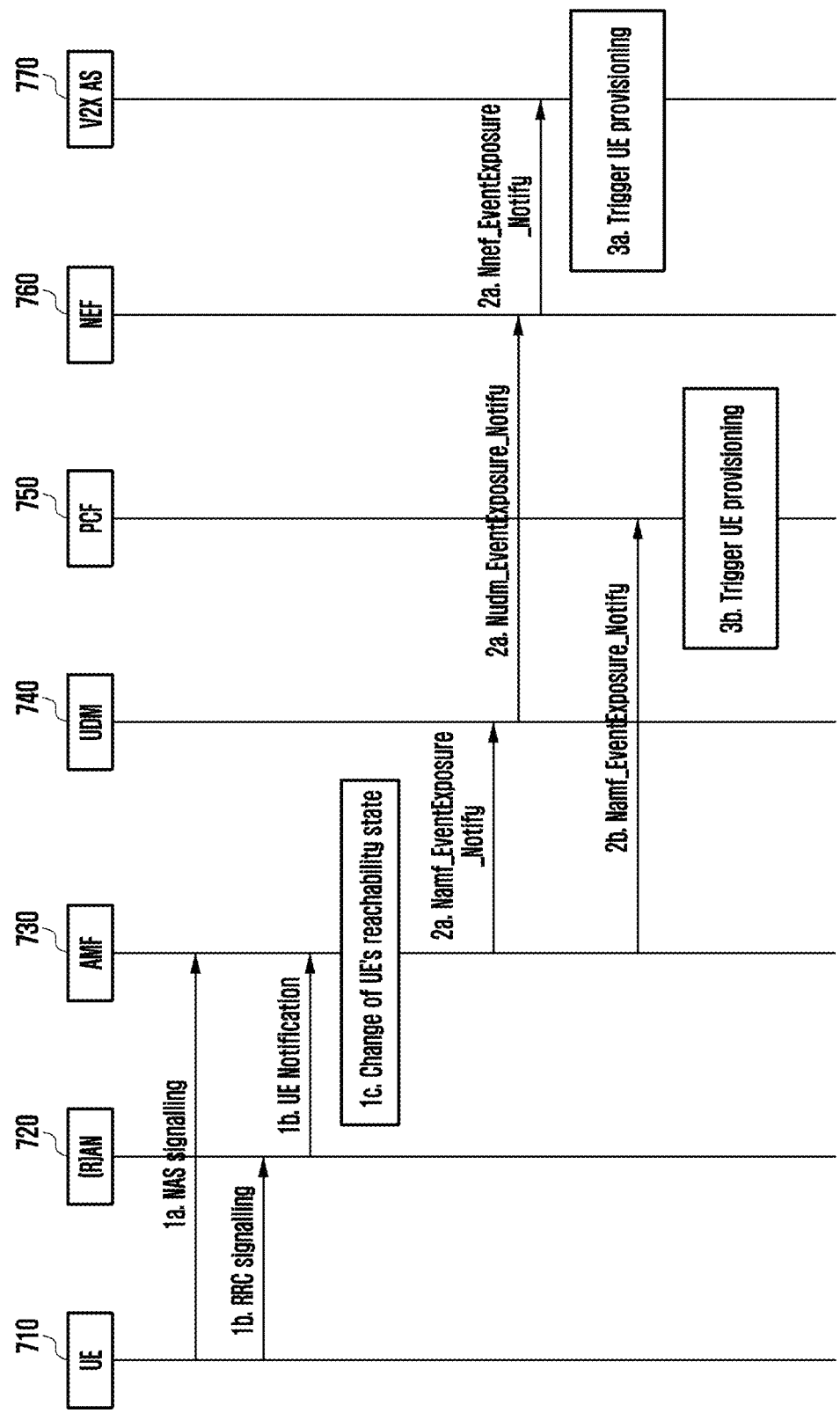
FIG. 7 illustrates a procedure in which an AMF detects and notifies a UE reachability event according to an embodiment.

FIG. 6 illustrates a procedure in which a PCF subscribes to a UE reachability event of a UE according to an embodiment.

The PCF 630 according to an embodiment may determine whether to subscribe to a UE reachability event of a UE in order to determine when to transmit data to the UE (step 1).

In contrast to the procedure of FIG. 5, the PCF 630 may transmit a "Namf_EventExposure_Subscribe" request message to the AMF 610 directly, not via the NEF (step 2).

On receiving the "Namf_EventExposure_Subscribe" request message, the AMF 610 may determine whether the network entity requesting the event is eligible to subscribe to the UE reachability event. If it is determined that the network entity is eligible to subscribe to the UE reachability event, the AMF 610 may set the URRP-AMF parameter to "set" (step 3).

In order to notify the PCF 630 that the event subscription request message transmitted by the PCF 630 has been successfully processed, the AMF 610 may transmit a response message back to the PCF 630 (step 4).

The PCF according to an embodiment may perform the UE reachability event subscription procedure illustrated in FIG. 6 in the process of performing the UE provisioning procedure illustrated in FIG. 2. For example, on receiving the "Nudr_DM_Notify" message from the UDR 250 in step 6 of FIG. 2, the PCF 240, 630 may determine to subscribe to a UE reachability event of the corresponding UE (step 1 of FIG. 6), and may transmit the "Namf_EventExposure_Subscribe" request message to the AMF 610 (step 2 of FIG. 6).

FIG. 7 illustrates a procedure in which an AMF detects and notifies a UE reachability event according to an embodiment.

The AMF 730 according to an embodiment may receive an NAS signaling message (e.g., Registration Request message, Service Request message, or the like) from the UE 710. If the NAS signaling message is received from the UE 710 which is in a "CM-IDLE" state, the AMF 730 may transition the state of the UE from "CM-IDLE" to "CM-CONNECTED". Further, on detecting that the UE becomes reachable, the AMF 730 may transition the reachability state of the UE from "unreachable" to "reachable" (step 1c).

If the URRP-AMF is set to "set" in the AMF 730 according to an embodiment, the AMF may perform a "Namf_EventExposure_Notify" service. The "Namf_EventExposure_Notify" message may include the UE ID (e.g., SUPI) of the UE and the reachability state information (e.g., UE Reachable) of the UE.

More specifically, as an example, when the V2X AS 540, 770 requests the AMF 510, 730 for the UE reachability event subscription according to the procedure illustrated in FIG. 5, the AMF 510, 730 may notify the V2X AS that the UE now becomes reachable, according to the procedure in step 2a.

As another example, when the PCF 630, 750 requests the AMF 610, 730 for the UE reachability event subscription according to the procedure illustrated in FIG. 6, the AMF 610, 730 may notify the PCF that the UE now becomes reachable, according to the procedure in step 2b.

On transmitting the "Namf_EventExposure_Notify" message according to the procedure in step 2a or 2b, the AMF 610, 730 may set the URRP-AMF configured for the corresponding UE to "not set".

On receiving the "Namf_EventExposure_Notify" message in step 2a, the V2X AS 770 can recognize that the UE 710 now becomes reachable and thus data can be transmitted to the UE 710. Accordingly, the V2X AS 770 may transmit the V2X service configuration information to the UE 710 (step 3a). The procedure in which the V2X AS 770 transmits the V2X service configuration information may follow the UE provisioning procedure illustrated in FIG. 2. For example, on receiving the message in step 2a of FIG. 7, the V2X AS 770 may transmit the message in step 2 of the FIG. 2 in order to transmit the V2X service configuration information to the UE 710. The message in step 2 of FIG. 2 may be a "Nnef_UEProvisioning_Create" or "Nnef_UEProvisioning_Update" message.

On receiving the "Namf_EventExposure_Notify" message in step 2b, the PCF 750 can recognize that the UE 710 now becomes reachable and thus data can be transmitted to the UE 710. Accordingly, the PCF 750 may transmit the V2X service configuration information to the UE 710 (step 3b). In order to transmit the V2X service configuration information to the UE 710, the PCF 750 may perform the procedure of FIG. 2, starting from step 7. For example, on receiving the message in step 2b of FIG. 7, the PCF 750 may transmit the message in step 9 of the FIG. 2 in order to transmit the V2X service configuration information to the UE 710.

FIG. 8 illustrates a procedure of registering a vehicle UE with a 5G network according to an embodiment.

Referring to FIG. 8, the vehicle UE 810 according to an embodiment may transmit a registration request message (step 1). On receiving the registration request message, the base station 820 may select an AMF to which the registration request message is delivered (step 2). The base station 820 may transmit the registration request message, received from the UE 810, to the AMF 830 (step 3). On receiving the registration request message, the AMF 830 may select a UDM (step 4). The AMF 830 may acquire the subscription information of the UE from the selected UDM 850 (step 5 and step 6). The AMF 830 may transmit an event subscription to the selected UDM 850 (step 7). The AMF 830 may select a PCF (step 8). The AMF 830 may perform policy association establishment with the selected PCF 840 (step 9). The AMF 830 may transmit a registration response message back to the UE 810 in response to the registration request message received in step 3 (step 10).

According to an embodiment, the registration request message in step 3 of FIG. 8 may be one example of the message in step 1a of FIG. 7. For example, on receiving the registration request message in step 3 of FIG. 8, the AMF 830, 730 may perform the procedure of FIG. 8, starting from step 4, and at the same time, may perform the procedure of FIG. 7, starting from step 1c.

The UE 810 according to an embodiment may include PII, which is the version information of the V2X service configuration information stored in the UE, in the registration request message in step 1 of FIG. 8.

The AMF 830 according to an embodiment may acquire the subscription information of the UE from the UDM 830 in step 5 or step 6 of FIG. 8, and the subscription information may include an indication whether the UE has subscribed to the V2X service. For example, if the subscription information includes slice information used for V2X (e.g., S-NSSAI defined for V2X), the AMF 830 may determine that the UE 810 has subscribed to the V2X service. If the UE 810 has subscribed to the V2X service, the AMF 830 may select a PCF 840, which provides policy management for the V2X service, in step 8 of FIG. 8, and may perform policy association establishment with the PCF 840 in step 9 of FIG. 8. The AMF 830 may provide the PII, which is the version information of the V2X service configuration information included in the registration request message received from the UE 810 in step 3 of FIG. 8, to the PCF 840 in step 9 of FIG. 8. Step 9 of FIG. 8 may correspond to step 0 of FIG. 4.

On completing the policy association establishment with the AMF 830 according to an embodiment, the PCF 840 may compare the PII received in step 9 of FIG. 8, which is the version information of the V2X service configuration information transmitted by the UE 810, with the PII which is the version information of the latest V2X service configuration information stored in the UDR. If the PII which is the version information of the V2X service configuration information transmitted by the UE 810 is not the latest version, the PCF 240 may perform the procedure in step 7 of FIG. 2. The PCF 840, 240 should select an AMF in the process of performing the procedure in step 8 of FIG. 2, and may select the AMF 830 with which the policy association establishment has been completed in step 9 of FIG. 8. The PCF 240 may transmit the "Namf_Communication_N1N2MessageTransfer" message to the AMF 230, 830 with which the policy association establishment has been completed in step 9 of FIG. 8 (step 9 of FIG. 2). The "Namf_Communication_N1N2MessageTransfer" message may include the latest V2X service configuration information stored in the UDR 250. Further, the "Namf_Communication_N1N2MessageTransfer" message may include the PII which is the version information of the V2X service configuration information.

Further, on completing the policy association establishment with the AMF 830 according to an embodiment, the PCF 840 may transmit the "Nudr_DM_Subscribe" message to the UDR 250 after step 9 of FIG. 8 so as to subscribe to an event provided by the UDR 250 (step 0 of FIG. 2).

If the event in which the V2X service configuration information is stored occurs in step 3 of FIG. 2, the UDR 250 may transmit a "Nudr_DM_Notify" notification message to the PCF 240 which has subscribed to the event in step 0 of FIG. 2 (step 6 of FIG. 2).

On receiving the "Nudr_DM_Notify" notification message from the UDR 250 according to an embodiment, the PCF 240 may transmit a "Namf_Communication_N1N2MessageTransfer" message to the AMF 230, 830 with which the policy association establishment has been completed in step 9 of FIG. 8 (step 9 of FIG. 2). The "Namf_Communication_N1N2MessageTransfer" message may include the V2X service configuration information transmitted by the V2X AS 270 in step 2 of FIG. 2 and stored in the UDR 250 in step 3 of FIG. 2. Further, the "Namf_Communication_N1N2MessageTransfer" message may include the PII which is the version information of the V2X service configuration information.

The UE 210 according to an embodiment may receive the UE provisioning information in step 10 of FIG. 2. The UE 210 may compare the PII, which is the version information of the V2X service configuration information received in step 10 of FIG. 2, with the PII which is the version information of the V2X service configuration information stored in the UE. If the versions according to the two PIIs are different, the UE 210 may store the V2X service configuration information received in step 10 of FIG. 2, instead of the V2X service configuration information already stored in the UE. Further, in addition to the V2X service configuration information, the UE 210 may store the PII information corresponding to the V2X service configuration information together.

Figure 9:
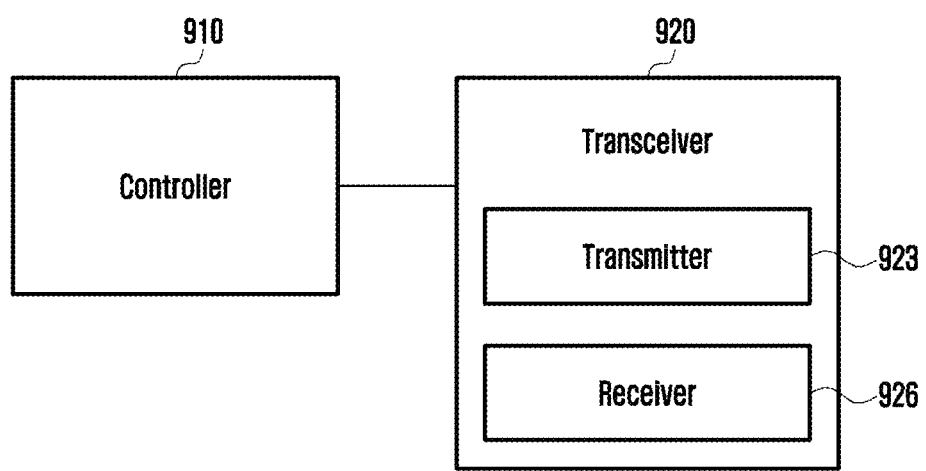
FIG. 9 illustrates a block diagram of a configuration of a UE according to an embodiment.

FIG. 9 illustrates a block diagram of a configuration of a UE according to an embodiment.

A UE according to an embodiment may include a transceiver 920 and a controller 910 for controlling the overall operation of the UE. Further, the transceiver 920 may include a transmitter 923 and a receiver 926.

The transceiver 920 may transmit and receive signals to and from other network entities.

The controller 910 may perform control such that the UE performs one of the operations according to the above embodiments. The controller 910 and the transceiver 920 do not need to be necessarily implemented as sperate modules, but of course may be implemented as one constituent unit such as a single chip. Further, the controller 910 may be electrically connected to the transceiver 920. Further, for example, the controller 910 may be a circuit, an application-specific circuit, or at least one processor. Further, operations of the UE may be achieved by providing a memory device, in which corresponding program codes are stored, in any constituent unit of the UE.

Figure 10:
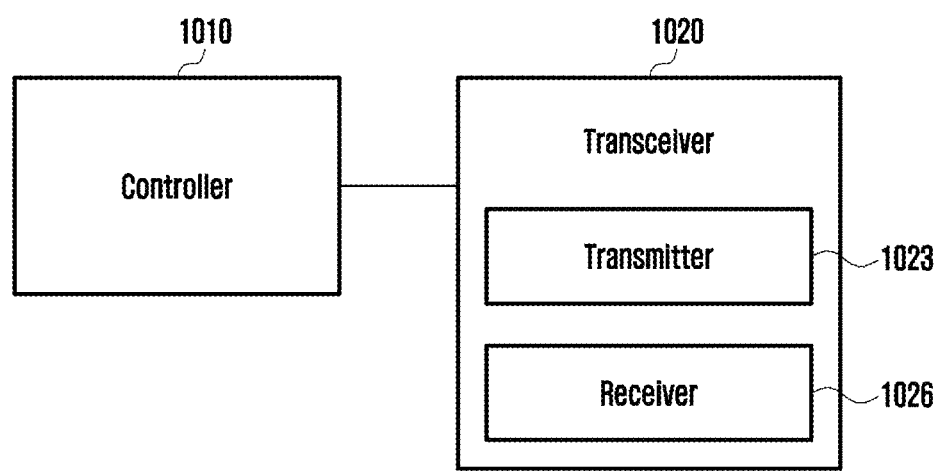
FIG. 10 illustrates a block diagram of a configuration of a network entity according to an embodiment.

FIG. 10 illustrates a block diagram of a configuration of a network entity according to an embodiment.

A network entity according to an embodiment may include a transceiver 1020 and a controller 1010 for controlling the overall operation of the network entity. Further, the transceiver 1020 may include a transmitter 1023 and a receiver 1026.

The transceiver 1020 may transmit and receive signals to and from other network entities.

The controller 1010 may perform control such that the network entity performs one of the operations according to the above embodiments. The controller 1010 and the transceiver 1020 do not need to be necessarily implemented as sperate modules, but of course may be implemented as one constituent unit such as a single chip. Further, the controller 1010 may be electrically connected to the transceiver 1020. Further, for example, the controller 1010 may be a circuit, an application-specific circuit, or at least one processor. Further, operations of the network entity may be achieved by providing a memory device, in which corresponding program codes are stored, in any constituent unit of the network entity.

It should be noted that the configuration views illustrated in FIGS. 9 and 10, the views illustrating the control/data signal transmission methods, the views illustrating the operation procedures, and the other configuration views are not intended to limit the protection scope of the disclosure. That is, all the constituent units, entities, or operation steps described and shown in the above drawings should not construed as elements essential for implementing the disclosure, and even when only some of the elements are included, the disclosure may be implemented without departing from the spirit and scope of the disclosure.

The above described operations of the base station or UE may be implemented by providing a memory device, in which corresponding program codes are stored, in any constituent unit of the base station or UE apparatus. That is, the controller of the base station or UE may perform the above described operations by reading and executing the program codes stored in the memory device by means of a processor or a central processing unit (CPU).

Various constituent units, modules, and the like of the entity, the base station apparatus, or the UE apparatus may also be operated using a hardware circuit, for example, a complementary metal oxide semiconductor-based logic circuit, firmware, software, and/or a combination of hardware and firmware and/or software embedded in a machine readable medium. As an example, various electric configurations and methods may be carried out using electric circuits such as transistors, logic gates, and application-specific integrated circuits (ASICs).

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an entity that implements a network exposure function (NEF), the method comprising:
   receiving, from a vehicle-to-everything (V2X) application server, a message including service parameter for a V2X communication of a user equipment (UE); and
   modifying data in a unified data repository (UDR) based on a type of the message and the service parameter included in the message,
   wherein the service parameter is transmitted from the UDR to a policy control function (PCF) in response to a modification of the data in the UDR,
   wherein the service parameter is provisioned to the UE via an access and mobility management function (AMF), by the PCF, and
   wherein the service parameter includes information for the V2X communication over Uu interface and information for the V2X communication over PC5 interface.

2. The method of claim 1, wherein the information for the V2X communication over PC5 interface includes:
   in case the UE is in coverage, information on a public land mobile network (PLMN) in which the UE is authorized to perform a service and radio access technology (RAT) over which the UE is authorized to perform the service in the PLMN, and
   in case the UE is out of coverage, information for indicating whether the UE is authorized to perform the service.

3. The method of claim 1, wherein the message further includes service description information for identifying a V2X service that the service parameter is applied to.

4. The method of claim 1, wherein the message further includes UE information for identifying one or more UEs for delivering the service parameter, and
   wherein the UE information includes at least one of a generic public subscription identifier (GPSI) for identifying individual UE, and an external group identifier for identifying group of UEs.

5. A method performed by an entity that implements a unified data repository (UDR) function, the method comprising:
   receiving, from a network exposure function (NEF), a service parameter for a vehicle-to-everything (V2X) communication of a user equipment (UE), the service parameter being included in a message from a V2X application server to the NEF;
   modifying data based on a type of the message and the service parameter; and
   transmitting the service parameter to a policy control function (PCF) in response to a modification of the data,
   wherein the service parameter is provisioned to the UE via an access and mobility management function (AMF), by the PCF, and
   wherein the service parameter includes information for the V2X communication over Uu interface and information for the V2X communication over PC5 interface.

6. The method of claim 5, wherein the information for the V2X communication over PC5 interface includes:
   in case the UE is in coverage, information on a public land mobile network (PLMN) in which the UE is authorized to perform a service and radio access technology (RAT) over which the UE is authorized to perform the service in the PLMN, and
   in case the UE is out of coverage, information for indicating whether the UE is authorized to perform the service.

7. The method of claim 5, wherein the message further includes service description information for identifying a V2X service that the service parameter is applied to and UE information for identifying one or more UEs for delivering the service parameter, and
   wherein the UE information includes at least one of a generic public subscription identifier (GPSI) for identifying individual UE, and an external group identifier for identifying group of UEs.

8. A method performed by an entity that implements a policy control function (PCF), the method comprising:
   receiving a service parameter from a unified data repository (UDR) in response to a modification of data in the UDR; and
   provisioning the service parameter to a user equipment (UE) via an access and mobility management function (AMF),
   wherein the service parameter being included in a message from a V2X application server to a network exposure function (NEF),
   wherein the data in the UDR is modified based on a type of the message and the service parameter included in the message, and
   wherein the service parameter includes information for a V2X communication over Uu interface and information for the V2X communication over PC5 interface.

9. The method of claim 8, wherein the information for the V2X communication over PC5 interface includes:
   in case the UE is in coverage, information on a public land mobile network (PLMN) in which the UE is authorized to perform a service and radio access technology (RAT) over which the UE is authorized to perform the service in the PLMN, and
   in case the UE is out of coverage, information for indicating whether the UE is authorized to perform the service.

10. The method of claim 8, wherein the message further includes service description information for identifying a V2X service that the service parameter is applied to and UE information for identifying one or more UEs for delivering the service parameter, and
    wherein the UE information includes at least one of a generic public subscription identifier (GPSI) for identifying individual UE, and an external group identifier for identifying group of UEs.

11. An entity that implements a network exposure function (NEF), the entity comprising:
- a transceiver; and
- a controller configured to:
  - receive, from a vehicle-to-everything (V2X) application server, a message including service parameter for a V2X communication of a user equipment (UE), and
  - modify data in a unified data repository (UDR) based on a type of the message and the service parameter included in the message,
  - wherein the service parameter is transmitted from the UDR to a policy control function (PCF) in response to a modification of the data in the UDR,
  - wherein the service parameter is provisioned to the UE via an access and mobility management function (AMF), by the PCF, and
  - wherein the service parameter includes information for the V2X communication over Uu interface and information for the V2X communication over PC5 interface.

12. The entity of claim 11, wherein the information for the V2X communication over PC5 interface includes:
- in case the UE is in coverage, information on a public land mobile network (PLMN) in which the UE is authorized to perform a service and radio access technology (RAT) over which the UE is authorized to perform the service in the PLMN, and
- in case the UE is out of coverage, information for indicating whether the UE is authorized to perform the service.

13. The entity of claim 11, wherein the message further includes service description information for identifying a V2X service that the service parameter is applied to.

14. The entity of claim 11, wherein the message further includes UE information for identifying one or more UEs for delivering the service parameter, and
- wherein the UE information includes at least one of a generic public subscription identifier (GPSI) for identifying individual UE, and an external group identifier for identifying group of UEs.

15. An entity that implements a unified data repository (UDR) function, the entity comprising:
- a transceiver; and
- a controller configured to:
  - receive, from a network exposure function (NEF), a service parameter for a vehicle-to-everything (V2X) communication of a user equipment (UE), the service parameter being included in a message from a V2X application server to the NEF,
  - modify data based on a type of the message and the service parameter, and
  - transmit the service parameter to a policy control function (PCF) in response to a modification of the data,
  - wherein the service parameter is provisioned to the UE via an access and mobility management function (AMF), by the PCF, and
  - wherein the service parameter includes information for the V2X communication over Uu interface and information for the V2X communication over PC5 interface.

16. The entity of claim 15, wherein the information for the V2X communication over PC5 interface includes:
- in case the UE is in coverage, information on a public land mobile network (PLMN) in which the UE is authorized to perform a service and radio access technology (RAT) over which the UE is authorized to perform the service in the PLMN, and
- in case the UE is out of coverage, information for indicating whether the UE is authorized to perform the service.

17. The entity of claim 15, wherein the message further includes service description information for identifying a V2X service that the service parameter is applied to and UE information for identifying one or more UEs for delivering the service parameter, and
- wherein the UE information includes at least one of a generic public subscription identifier (GPSI) for identifying individual UE, and an external group identifier for identifying group of UEs.

18. An entity that implements a policy control function (PCF), the entity comprising:
- a transceiver; and
- a controller configured to:
  - receive a service parameter from a unified data repository (UDR) in response to a modification of data in the UDR, and
  - provision the service parameter to a user equipment (UE) via an access and mobility management function (AMF),
  - wherein the service parameter being included in a message from a V2X application server to a network exposure function (NEF),
  - wherein the data in the UDR is modified based on a type of the message and the service parameter included in the message, and
  - wherein the service parameter includes information for a V2X communication over Uu interface and information for the V2X communication over PC5 interface.

19. The entity of claim 18, wherein the information for the V2X communication over PC5 interface includes:
- in case the UE is in coverage, information on a public land mobile network (PLMN) in which the UE is authorized to perform a service and radio access technology (RAT) over which the UE is authorized to perform the service in the PLMN, and
- in case the UE is out of coverage, information for indicating whether the UE is authorized to perform the service.

20. The entity of claim 18, wherein the message further includes service description information for identifying a V2X service that the service parameter is applied to and UE information for identifying one or more UEs for delivering the service parameter, and
- wherein the UE information includes at least one of a generic public subscription identifier (GPSI) for identifying individual UE, and an external group identifier for identifying group of UEs.

* * * * *